Feb. 4, 1941. R. W. CANFIELD 2,230,608
APPARATUS FOR AND METHOD OF CIRCULATING GLASS IN A CONTAINER
Filed Aug. 25, 1938
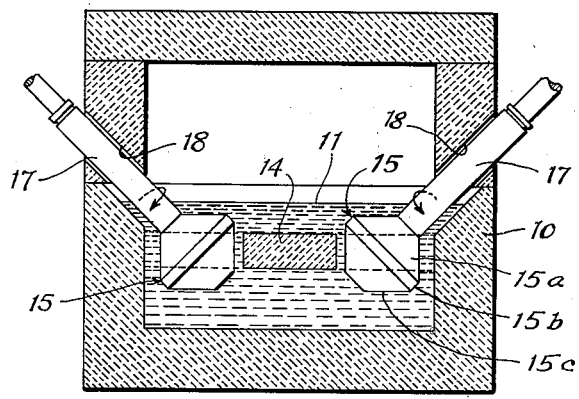
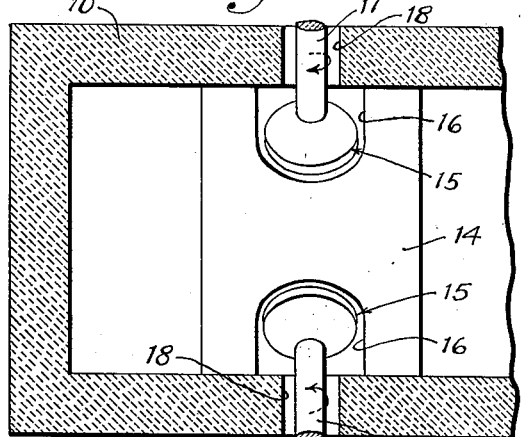
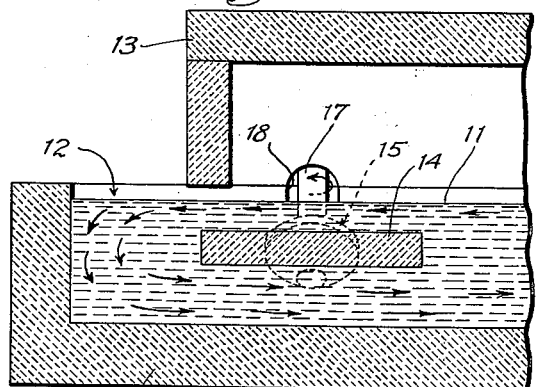
Inventor
Robert W. Canfield
by Brown + Parham
Attorneys
Witness
W. B. Thayer.

UNITED STATES PATENT OFFICE 2,230,608

APPARATUS FOR AND METHOD OF CIRCULATING GLASS IN A CONTAINER

Robert W. Canfield, West Hartford, Conn., assignor to Hartford-Empire Company, Hartford, Conn., a corporation of Delaware Application August 25, 1938, Serial No. 226,653

9 Claims. (Cl. 49—54)

This invention relates to improvements in apparatus for and methods of circulating molten glass in a container, such as a forehearth or tank extension from which glass is constantly removed by suction gathering receptacles or by some other known means or in some other known way.

While not limited to such use, the invention is particularly adapted for and advantageous in circulating molten glass in a container as above described from which glass is removed at one or more gathering stations by suction gathering receptacles which, during their glass gathering operations, contact with the surface of the glass in the container. As is well known, the gathering of glass from the surface of a supply body or pool or molten glass in such a container tends to interfere with the production and maintenance of glass of uniform temperature and homogeneity at the stations or places at which the gathering receptacles gather successive quotas or portions of glass.

An object of the present invention is to provide improved apparatus for and a novel method of circulating the glass of a supply body or pool in a container of the character above referred to so as effectively to produce and maintain desirable uniformity of temperature and homogeneity of the glass in the portion or portions of the supply body or pool from which quotas of glass are removed by suction gathering receptacles or otherwise.

According to the present invention, glass at the surface of the supply body or pool and extending to a substantial depth in such supply body or pool is caused to move throughout substantially the full width of the container from a place rearwardly of the place or places at which glass is being gathered or otherwise removed past such place or places to the front or outer end of the container. Thence the glass at the front or outer end of the container moves downwardly to a lower level at which it is caused to move rearwardly to a zone located rearwardly of the place or places at which glass quotas are being gathered or otherwise removed. Any chilled bits or streaks of glass are thus thoroughly commingled with the hotter, oncoming glass of the supply body and all glass passing to the place or places at which further glass quotas are to be gathered or otherwise removed will be brought to a condition of substantial homogeneity and uniformity of temperature.

Other objects and adavantages of the invention will hereinafter be pointed out or will become apparent from the following description of a practical embodiment of the invention, as illustrated in the accompanying drawing, in which Fig. 1 is a transverse vertical section through a container for molten glass provided with glass circulating apparatus embodying structural features of the invention, Fig. 2 is a horizontal section through the glass container with the glass omitted to show more clearly the structure of the improved glass circulating apparatus, and Fig. 3 is a longitudinal vertical section through the container and the improved glass circulating apparatus, illustrating the manner in which glass is circulated in the container.

In the drawing, a container for molten glass is designated 10. This container may be a forehearth or furnace tank extension which in practice, is suitably connected with a melting tank or furnace (not shown) so that glass will pass from the tank or furnace continuously into the container to maintain therein a supply body or pool 11 of molten glass of a substantially constant depth, the inflow of new glass from the tank or furnace compensating for constant removal of glass from the outer end portion of the container. As shown, the outer end portion of the container is open at its top throughout the full width of the container in the zone generally indicated at 12. Suction gathering receptacles (not shown) may be brought to the surface of the glass in this zone at a predetermined place or at each of a plurality of transversely spaced places and filled with glass from such supply body or pool in the usual way. It will be noted that this zone extends from the front or outer end of the container rearwardly for a sufficient distance to afford access of the gathering receptacles to the glass, the cover for the container, designated 13, being formed to terminate at the distance required from the front end of the container.

In carrying out the invention, I propose to circulate a surface layer or stratum of molten glass forwardly through the gathering zone 12 from a place rearwardly thereof, thence downwardly at the front of the container and rearwardly at a lower level, substantially as shown by the arrows in Fig. 3.

Apparatus provided according to the present invention may comprise a substantially horizontal flow separating member 14 in the form of a flat refractory slab extending completely across the container at a substantial distance below the level of the glass therein and also at a substantial distance above the bottom of the container. This flow separating member 14 is located in the container rearwardly of the zone from which glass is gathered or removed.

For cooperating with the flow separating member 14, the invention provides a pair of circulators having glass circulating or stirring heads 15 located in apertures or spaces 16 in the side edge portions of the member 14 intermediate the forward and rearward edges thereof. The circulating or stirring heads 15 extend both above and below the upper and lower surfaces of the member 14 and preferably are carried by inclined rotating rods or stems 17 which extend through suitable openings 18 in the side walls of the container and are rotated by any suitable means (none shown). The upper portions of the circulating or stirring heads may turn toward the front end of the container as indicated by the arrows in the several views of the drawing while the lower portions of such circulating or stirring heads turn toward the rear or intake end of the container.

The circulating or stirring heads preferably have the doubly conoidal shape shown in the drawing. (See Fig. 1.) Each such head has a portion 15a next to its supporting stem or rod enlarging in cross sectional area from its juncture with such stem or rod to the middle portions of the head, which may be circular as indicated at 15b. The remainder of the head, indicated at 15c, may decrease in cross sectional area toward the tip or extremity of such head. The preferred shape of the gathering head and the inclination of its supporting stem or rod preferably are such that the portion 15a of each head is tangent at its upper part to a plane parallel with the surface of the supply body or pool of molten glass, as best seen in Fig. 1, and the lower surface of the portion 15c of the head is tangent to a plane which likewise is parallel to the surface of the supply body or pool. As also shown in the same view, the surfaces of the head which are diametrically opposite the upper and lower surfaces thereof are tangent to substantially vertical planes and thus parallel with the side wall of the container and the vertical wall of the aperture or opening 16 in the member 14 to which these substantially vertical surfaces of the head respectively are closely adjacent.

Rotation of the heads 15 as indicated by the arrows and in conjunction of the flow dividing member 14 may cause continuous substantially uniform forward flow movement of an upper layer or stratum of, the glass of the supply body throughout substantially the full width thereof, the heads applying forward impulsion directly to the side edge portions of this layer or stratum and the middle portion of such layer or stratum moving forwardly therewith either because of its normal tendency to move more rapidly than the side edge portions or because of the pull exerted thereon by the side edge portions or for both of these causes. At the same time, the glass between the lower surface of the separator 14 and the bottom of the container will be continuously impelled or caused to move rearwardly in a substantially uniform manner throughout substantially the full width of such container.

The forwardly moving upper layer of glass, on reaching the front wall of the container, will turn downwardly and join the rearwardly moving lower layer or stratum of glass. The glass in the portion of the container from which glass is gathered or otherwise removed, and particularly a layer of glass extending from the surface of the supply body or pool downwardly to a substantial depth thus will be maintained substantially homogeneous and at a substantial uniform temperature. Any chilled bits or portions of glass produced by preceding glass gathering operations at the surface of the supply body or pool of glass in the glass delivery or gathering zone will be carried downwardly into the body or pool of glass and thence rearwardly and will be thoroughly commingled with the oncoming mass of glass in a rearward portion of the container before they can again reach the portion of the container from which glass is being gathered or otherwise removed.

Glass circulating or stirring heads of shapes other than that specifically described and shown in the drawings may be employed in carrying out the invention. Various other changes from the structure shown likewise may be made in carrying out the invention without departing from the spirit and scope of such invention.

I claim:

1. Apparatus for circulating molten glass of a supply body or pool in a container comprising means submerged in the supply body or pool entirely below the normal level of the surface thereof for positively and directly impelling a surface stratum of such glass of substantial depth continuously in one direction in the container and simultaneously positively and directly impelling a lower stratum of such glass in the reverse direction and a substantially horizontal flow dividing member located in said body or pool of glass between the levels at which said means for impelling glass acts directly on said oppositely impelled strata of glass.

2. Apparatus for circulating molten glass of a supply body or pool in a container, an outer end portion of which is adapted for the removal of quotas of such glass in suction gathering receptacles, comprising a pair of glass circulating members completely submerged in the glass of the supply body or pool adjacent to opposite sides of the container rearwardly of said outer end portion of the container and operable positively and directly to impel glass of the supply body or pool at the surface thereof forwardly to the outer end of the container and simultaneously positively and directly to impel glass at a lower level in said supply body or container rearwardly therein and a substantially horizontal member completely submerged in the glass around said circulating members for separating the forwardly moving surface glass from the lower rearwardly moving glass, said horizontal member being entirely disposed between horizontal planes tangent to the upper and lower portions, respectively, of said glass circulating members.

3. The combination with a container for molten glass having bottom, side and outer end walls for supporting a supply body of the glass in position to permit successive quotas thereof to be gathered from the outer end portion of such body in suction gathering receptacles, of a pair of inclined rotatable glass stirring or circulating members extending through the side walls of the container at places opposite each other and located rearwardly of said outer end portion of the supply body, said stirring or circulating members having enlarged head portions completely submerged in the glass of the supply body and operable by the rotation thereof to impel a surface stratum of glass of substantially the full width of the container forwardly to the outer end wall of such container and simultaneously to impel a lower stratum of glass of substantially the same width rearwardly in the container, each of said heads comprising a conoidal portion formed with relation to the inclination thereof to cause the uppermost surface thereof to lie tangent to a plane parallel with the surface of the supply body of glass.

4. The combination with a container for molten glass having bottom, side and outer end walls for supporting a supply body of the glass in position to permit successive quotas thereof to be gathered from the outer end portion of such body in suction gathering receptacles, of a pair of inclined rotatable glass stirring or circulating members extending through the side walls of the container at places opposite each other and located rearwardly of said outer end portion of the supply body, said stirring or circulating members having enlarged head portions completely submerged in the glass of the supply body and operable by the rotation thereof to impel a surface stratum of glass of substantially the full width of the container forwardly to the outer end wall of such container and simultaneously to impel a lower stratum of glass of substantially the same width rearwardly in the container, each of said heads comprising a conoidal portion formed with relation to the inclination thereof to cause the uppermost surface thereof to lie tangent to a plane parallel with the surface of the supply body of glass and the diametrically opposite surface thereof tangent to a plane parallel to the adjacent side wall of the container.

5. The combination with a container for molten glass having bottom, side and outer end walls for supporting a supply body of the glass in position to permit successive quotas thereof to be gathered from the outer end portion of such body in suction gathering receptacles, of a pair of inclined rotatable glass stirring or circulating members extending through the side walls of the container at places opposite each other and located rearwardly of said outer end portion of the supply body, said stirring or circulating members having enlarged head portions completely submerged in the glass of the supply body and operable by the rotation thereof to impel a surface stratum of glass of substantially the full width of the conatiner forwardly to the outer end wall of such container and simultaneously to impel a lower stratum of glass of substantially the same width rearwardly in the container, each of said heads comprising a conoidal portion formed with relation to the inclination thereof to cause the uppermost surface thereof to lie tangent to a plane parallel with the surface of the supply body of glass, said head also comprising a conoidal further portion having its lowermost surface parallel to the uppermost surface of the first conoidal portion.

6. The combination with a container for molten glass having bottom, side and outer end walls for supporting a supply body of the glass in position to permit successive quotas thereof to be gathered from the outer end portion of such body in suction gathering receptacles, of a pair of inclined rotatable glass stirring or circulating members extending through the side walls of the container at places opposite each other and located rearwardly of said outer end portion of the supply body, said stirring or circulating members having enlarged head portions completely submerged in the glass of the supply body and operable by the rotation thereof to impel a surface stratum of glass of substantially the full width of the container forwardly to the outer end wall of such container and simultaneously to impel a lower stratum of glass of substantially the same width rearwardly in the container, and a substantially horizontal flat member of less thickness than the vertical dimensions of said heads submerged in the glass of the supply body between and fore and aft of said heads, the upper and lower surfaces of said heads respectively being located above and below the upper and lower surfaces of said substantially flat member and respectively serving to impel glass forwardly in the container over said substantially flat member and rearwardly in the container beneath said substantially flat member.

7. The combination with a container for molten glass having bottom, side and outer end walls for supporting a supply body of the glass in position to permit successive quotas thereof to be gathered from the outer end portion of such body in suction gathering receptacles, of a pair of inclined rotatable glass stirring or circulating members extending through the side walls of the container at places opposite each other and located rearwardly of said outer end portion of the supply body, said stirring or circulating members having enlarged head portions completely submerged in the glass of the supply body and operable by the rotation thereof to impel a surface stratum of glass of substantially the full width of the container forwardly to the outer end wall of such container and simultaneously to impel a lower stratum of glass of substantially the same width rearwardly in the container, each of said heads comprising a conoidal portion formed with relation to the inclination thereof to cause the uppermost surface thereof to lie tangent to a plane parallel with the surface of the supply body of glass, said head also comprising a conoidal further portion having its lowermost surface parallel to the uppermost surface of the first conoidal portion, and a substantially flat glass flow separating member extending across the container and having apertured or cut-out portions surrounding the glass stirring or circulating heads, said separating member being disposed entirely beneath the surface of the glass so that the upper and lower surfaces of such member are respectively located below and above the planes of the uppermost surfaces of the first named conoidal portions and the lowermost surfaces of the second named conoidal portions, respectively, of the glass stirring or circulating heads.

8. The method of circulating glass in a container which comprises the steps of causing an upper stratum of the glass of substantially the full width of the container to move horizontally in one direction in the container without substantial change of level of any portion thereof by direct contact of impelling means with glass of said upper stratum and a lower stratum of glass of like width to move horizontally in the opposite direction in the container, also by direct contact of impelling means with glass of said lower stratum.

9. The method of circulating glass in a container which comprises the steps of simultaneously applying like impelling forces directly to surface portions of the glass adjacent to opposite sides of the container, tending to cause flow movement of the upper layer of the glass in the container in one direction therein without substantial change of level of any portion thereof, and applying like impelling forces but in the opposite direction directly to portions of the glass at a lower level in the container, tending to cause flow movement of a lower stratum of such glass in the opposite direction.

ROBERT W. CANFIELD.